(12) United States Patent
Wei et al.

(10) Patent No.: US 8,305,180 B2
(45) Date of Patent: Nov. 6, 2012

(54) ELECTROMAGNETIC COIL MEANS

(75) Inventors: Xianrang Wei, Zhejiang Province (CN); Ze Yuan, Zhejiang Province (CN)

(73) Assignee: Zhejiang Sanhua Co., Ltd., Xinchang County, Zhejiang Province (CN)

( * ) Notice: Subject to any disclaimer, the term of this patent is extended or adjusted under 35 U.S.C. 154(b) by 140 days.

(21) Appl. No.: 12/784,332

(22) Filed: May 20, 2010

(65) Prior Publication Data

US 2010/0301984 A1    Dec. 2, 2010

(30) Foreign Application Priority Data

May 26, 2009    (CN) .......................... 2009 1 0143796

(51) Int. Cl.
*H01F 27/29*     (2006.01)
*H02K 37/00*     (2006.01)

(52) U.S. Cl. .................... 336/192; 310/49.19; 310/49.23

(58) Field of Classification Search .................... 336/82, 336/192, 195, 198, 199, 208; 310/49 R, 310/49.13, 49.19, 49.23, 49.31
See application file for complete search history.

(56) References Cited

U.S. PATENT DOCUMENTS

| | | | | |
|---|---|---|---|---|
| 4,841,190 A * | 6/1989 | Matsushita et al. | ............ | 310/257 |
| 5,121,017 A * | 6/1992 | Yamamoto et al. | ........ | 310/49.12 |
| 5,465,911 A * | 11/1995 | Hall | ............. | 239/585.4 |
| 5,523,634 A * | 6/1996 | Takahashi et al. | ......... | 310/49.07 |
| 5,774,036 A * | 6/1998 | Hrytzak et al. | ................ | 336/192 |
| 6,008,712 A * | 12/1999 | Tokuda et al. | ................ | 336/198 |
| 6,078,240 A * | 6/2000 | Huang | ............................. | 336/90 |
| 6,476,703 B2 * | 11/2002 | Geltsch et al. | ................ | 336/192 |
| 6,504,465 B2 * | 1/2003 | Matsumoto | .................... | 336/192 |
| 6,583,703 B2 * | 6/2003 | Li | ................................... | 336/192 |
| 6,856,227 B2 * | 2/2005 | Ushio et al. | .................... | 336/198 |
| 6,876,109 B2 * | 4/2005 | Matsushita et al. | ........ | 310/49.08 |
| 7,071,593 B2 * | 7/2006 | Matsushita et al. | ........... | 310/257 |
| 7,093,362 B2 * | 8/2006 | Dallmeyer et al. | ....... | 29/890.124 |
| 7,173,351 B2 * | 2/2007 | Ogawa | ........................ | 310/49.36 |
| 7,375,446 B2 * | 5/2008 | Suzuki et al. | .................... | 310/86 |
| 7,446,442 B2 * | 11/2008 | Horiike | ....................... | 310/49.07 |
| 7,449,805 B2 * | 11/2008 | Bin | ............................. | 310/49.14 |

(Continued)

FOREIGN PATENT DOCUMENTS

CN               1083279 A        3/1994

(Continued)

*Primary Examiner* — Mohamad Musleh
*Assistant Examiner* — Joselito Baisa
(74) *Attorney, Agent, or Firm* — Wolf, Greenfield & Sacks, P.C.

(57) ABSTRACT

The present invention discloses an electromagnetic coil means, comprising a terminal part and pins passing through the terminal part, wherein the pins are divided into a first group of pins connected with an upper coil stator and a second group of pins connected with a lower coil stator which are spaced apart from each other; the first group of pins comprises first outer sections with first head portions and first inner sections with first root portions; the second group of pins comprising second outer sections with second head portion and second inner sections with second root portions; the first and second head portions extend out from a pin leading-out surface of the terminal part, characterized in that, at least one group of the first and second groups of pins are bent, and a distance between adjacent said first and second head portions is larger than that between adjacent said first and second root portions. By this electromagnetic coil means, the distance of solder joints between adjacent head portions of pins is increased, thus the insulation performance between the solder joints is improved.

33 Claims, 6 Drawing Sheets

U.S. PATENT DOCUMENTS

| | | | |
|---|---|---|---|
| 7,511,392 B2 * | 3/2009 | Rubbo et al. | 310/68 D |
| 7,646,121 B2 * | 1/2010 | Bin | 310/71 |
| 7,709,982 B2 * | 5/2010 | Ohuchi et al. | 310/71 |
| 7,782,162 B2 * | 8/2010 | Nishida | 335/201 |
| 7,843,106 B2 * | 11/2010 | Huang | 310/257 |

FOREIGN PATENT DOCUMENTS

| | | |
|---|---|---|
| CN | 1630975 A | 6/2005 |
| CN | 1694204 A | 11/2005 |
| CN | 1719567 A | 1/2006 |
| CN | 200994101 A | 12/2007 |
| JP | 2002/310031 A | 10/2002 |
| JP | 2004/153077 A | 5/2004 |
| JP | 2007/7110884 A | 4/2007 |
| KR | 2019990014759 U | 5/1999 |
| KR | 2019990030190 U | 7/1999 |
| KR | 100442241 A | 7/2004 |

* cited by examiner

ELECTROMAGNETIC COIL MEANS

FIELD OF THE INVENTION

The present invention relates to the field of mechanical electronics, more particularly, to an electromagnetic coil means.

THE RELATED ART

Electromagnetic coil means may be applied in various fields. For example, it may be used as the coil of electronic expansion valve in an air-conditioner refrigeration system, which is a typical use thereof, or used as the stator part in a step motor, or used in an electronic device having a plurality of terminals connected with lead by means of soldering.

Figure 1:
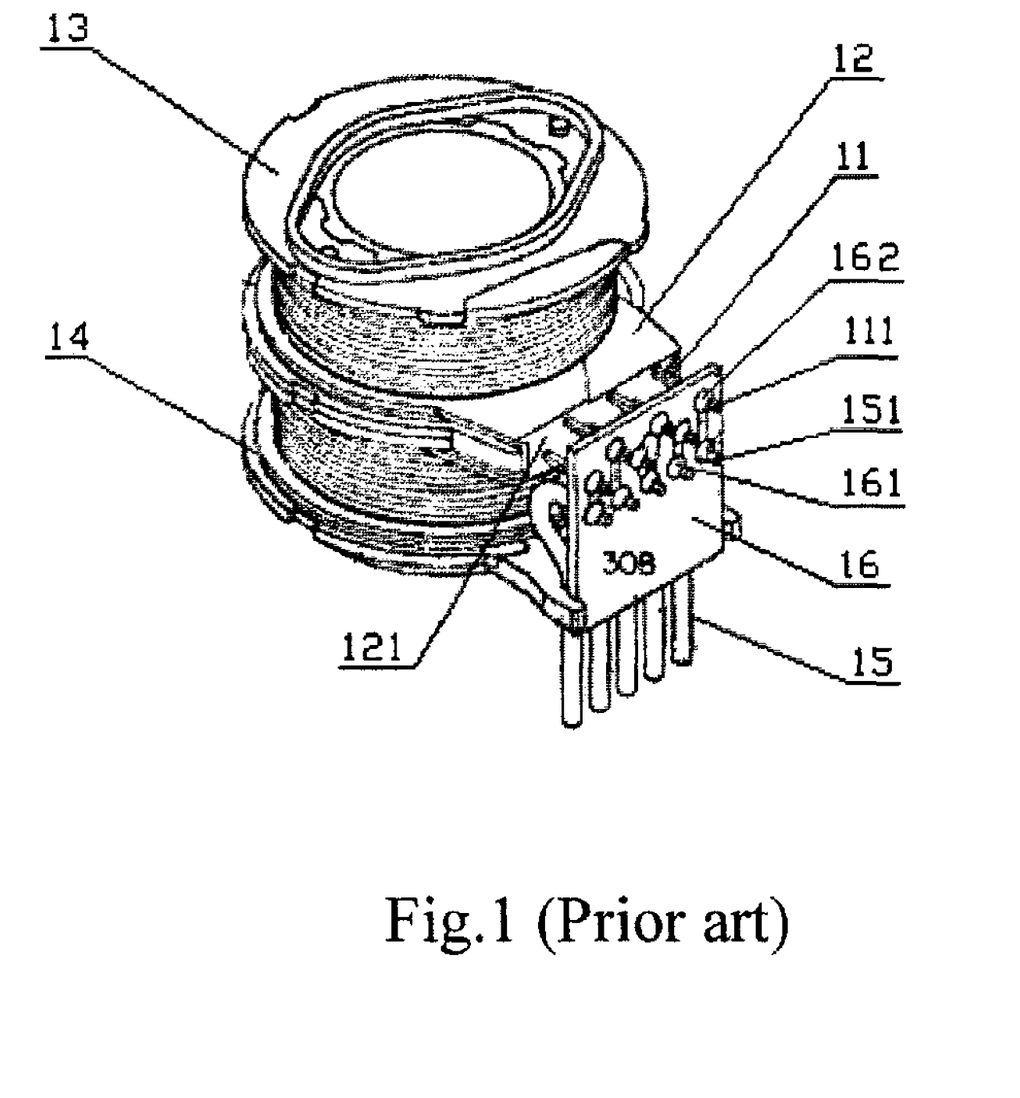
FIG. 1 is a schematic view of the structure of a typical electromagnetic coil means in the prior art.

Reference is made to FIG. 1, which is a schematic view showing the structure of a typical electromagnetic coil means in the prior art.

The electromagnetic coil means in the prior art includes a terminal part 12 and some pins 11 passing through the terminal part 12. The pins 11 are divided into a first group of pins connected with an upper coil stator and a second group of pins connected with a lower coil stator, in which the first and the second groups of pins are disposed spaced from each other. A head portion of the pin 11 passes through a pin leading-out surface 121 of the terminal part 12. The electromagnetic coil means has a frame including an upper frame 13 and a lower frame 14, which have an integral structure. The pins 11 of the electromagnetic coil means are connected with cable leads 15 by means of a circuit board 16.

The circuit board 16 has pin holes 162 and core holes 161 each as many as the pins 11, and the pin holes 162 and the core holes 161 are arranged in pairs. The pin head portion 111 extends out from the pin hole 162, and a head portion 151 of the cable lead extends out from the core hole 161. The pin head portion 111 is soldered to the cable lead head portion 151 through soldering materials.

There should be a relatively large distance between the pins of the electromagnetic coil means, thereby the insulation performance between the solder joints of pins and thus the stability and reliability of the operation of the electromagnetic coil could be ensured. However, due to the restriction caused by factors such as the overall volume of the electromagnetic coil means and the like, the distance between the pins can not be increased efficiently, which leads to a small distance between adjacent pins 11 in the prior art. Therefore, the distances between head portions 111 of adjacent pins and between the solder joints thereof are small, so that the insulation performance between the solder joints between pin head portions 111 is deteriorated, and the soldering operation is inconvenient.

SUMMARY OF THE INVENTION

The technical problem to be solved by the present invention is to provide an electromagnetic coil means which has a structure designed to be capable of improving the insulation performance between solder joints of pin head portions, and facilitating the soldering operation, thus to ensure the stability and reliability of the operation of the electromagnetic coil means.

To solve the above technical problem, the present invention provides an electromagnetic coil means comprising a terminal part and pins passing through the terminal part, wherein the pins are divided into a first group of pins connected with an upper coil stator and a second group of pins connected with a lower coil stator which are spaced apart from each other; the first group of pins comprises first outer sections with first head portions and first inner sections with first root portions; the second group of pins comprising second outer sections with second head portion and second inner sections with second root portions; the first and second head portions extend out from a pin leading-out surface of the terminal part, at least one group of the first and second groups of pins are bent, and a distance between adjacent said first and second head portions is larger than that between adjacent said first and second root portions.

Preferably, both the first and second groups of pins are bent upward; the first outer sections are substantially perpendicular to the first inner sections, and the second outer sections are substantially perpendicular to the second inner sections; a plane in which the centerlines of the first outer sections lie and a plane in which the centerlines of the second outer sections lie are substantially parallel and have an appropriate horizontal distance therebetween.

Preferably, the pin leading-out surface is an inclined surface, and an appropriate acute angle is formed between the first and second head portions and the inclined surface.

Preferably, the pin leading-out surface comprises an upper step surface and a lower step surface substantially parallel to the upper step surface; the first head portions are substantially perpendicular to the upper step surface, and the second head portions are substantially perpendicular to the lower step surface.

Preferably, each of said pins has the same size, and adjacent first and second inner sections have equal distances therebetween and lie in the same horizontal plane; the horizontal distance is less than $$4\sqrt{\frac{3}{2}}$$

times the distance between adjacent first and second inner sections.

Preferably, the horizontal distance equals to $$\sqrt{\frac{3}{2}}$$

times the distance between adjacent first and second inner sections.

Preferably, the pin leading-out surface is an inclined surface, both the first and second groups of pins are bent upward; first middle portions between the first inner sections and the first head portions are substantially perpendicular to the first inner sections, and an appropriate angle is formed between the first head portions and the first middle portions; second middle portions between the second inner sections and the second head portions are substantially perpendicular to the second inner sections, and an appropriate angle is formed between the second head portions and the second middle portions; the first and second head portions are substantially perpendicular to the inclined surface.

Preferably, one group of the first and second groups of pins are bent upward while the other group are bent downward; a plane in which the centerlines of the first outer sections lie and a plane in which the centerlines of the second outer sections lie are substantially parallel to each other and spaced apart with an appropriate vertical distance; the first and second head portions are substantially perpendicular to the pin leading-out surface.

Preferably, each of said pins has the same size, and adjacent first and second root portions have equal distances therebetween and lie in the same horizontal plane; the vertical distance is less than $4\sqrt{3}$ times the distance between adjacent first and second root portions.

Preferably, the vertical distance equals to $\sqrt{3}$ times the distance between adjacent first and second root portions.

Preferably, the first and second head portions are connected with cable leads by means of a circuit board; and the terminal part has linear grooves for receiving the cable leads.

Preferably, the circuit board comprises pin holes and core holes each as many as the pins; the pin holes and core holes are arranged in pairs adjacent to each other and connected with each other by conducting materials; the first and second head portions extend out from the pin holes, and head portions of the cable leads extend out from the core holes; the first and second head portions are soldered with the head portions of the cable leads by soldering materials.

Preferably, the center distance between the pin holes and the core holes is greater than 0.5 times the sum of diameters of pin holes and core holes and less than 5 times thereof.

Preferably, the electromagnetic coil means further comprises a cover with a protruded locating portion, and the terminal part comprises a locating groove engaging with the protruded locating portion; and the protruded locating portion engages with the locating groove and is sealed therewith by resin materials Preferably, the electromagnetic coil means comprises a frame, which in turn comprises an upper frame and a lower frame detachable from the upper frame, and the upper and lower frames have the same structure and size.

In the electromagnetic coil means provided in this invention, at least one group of the first and second groups of pins are bent, and a distance between adjacent said first and second head portions is larger than that between adjacent said first and second root portions. The increase of the distance between adjacent first and second head portions enables to increase the distance between solder joints of adjacent pin head portions without increasing the overall volume of the electromagnetic coil means, thus the insulation performance between solder joints of adjacent pin head portions is improved and soldering operation is facilitated, ensuring the stability and reliability of the operation of the electromagnetic coil means.

DETAILED DESCRIPTION OF THE INVENTION

The present invention is intended to provide an electromagnetic coil means which is designed with a structure that improves the insulation performance between solder joints of pin head portions and facilitates the soldering operation, ensuring the stability and reliability of the operation of the electromagnetic coil means.

A further detailed description of the invention is given hereinafter with reference to accompanied drawings and specific embodiments for those skilled in the art to better understand the technical solution of the present invention.

Figure 2:
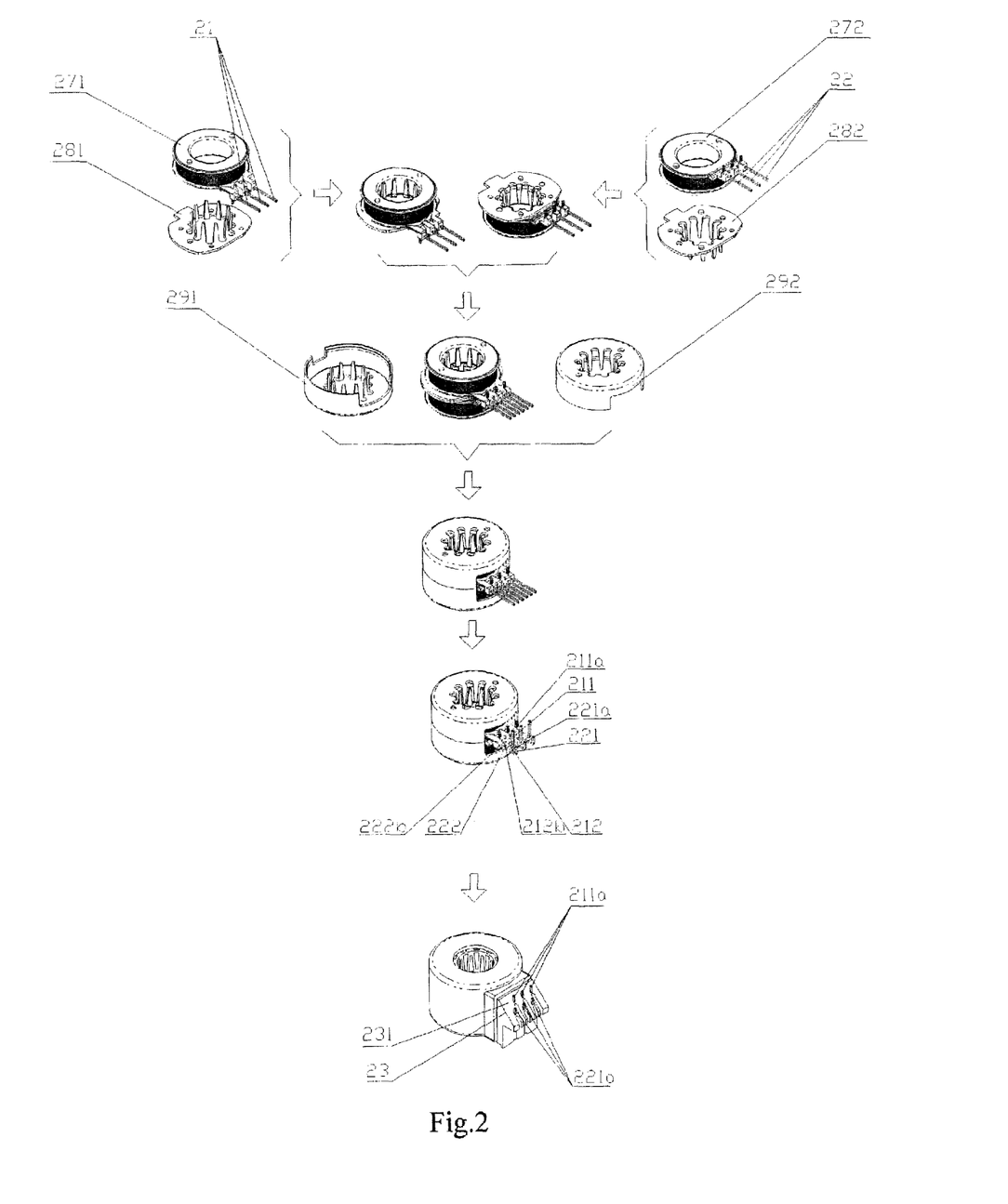
FIG. 2 is an assembly flowchart of an electromagnetic coil means provided in a first embodiment of the present invention.

Reference is made to FIG. 2, which is an assembly flowchart of an electromagnetic coil means provided in a first embodiment of the present invention.

The assembly process of the electromagnetic coil means provided is in the first embodiment of the present invention is as follows:

Enameled wire is wound onto an upper frame 271, and the ends of the enameled wire are connected with first root portions 212b of a first group of pins 21, forming an upper coil stator on which an upper electromagnetic polar board 281 is mounted. Enameled wire is wound onto a lower frame 272, and the ends of the enameled wire are connected with second root portions 222b of a second group of pins 22, forming a lower coil stator on which a lower electromagnetic polar board 282 is mounted. The upper coil stator mounted with the upper electromagnetic polar board 281 and the lower coil stator mounted with the lower electromagnetic polar board 281 are assembled together, forming an electromagnetic coil stator. The electromagnetic coil stator is assembled with an upper shell 292 and a lower shell 291, forming a stator component. Then, the pins of the stator component are bent. Finally, the stator component with bent pins is positioned into a plastic resin packaging model so as to be packaged by injection molding, forming a terminal part 23 of the electromagnetic coil means. Consequently, the assembly of the electromagnetic coil means is completed.

A plurality of different embodiments of the electromagnetic coil means provided in the present invention are obtained depending on different bending ways of the pins of the stator component. The assembly process of the electromagnetic coil means provided in each of the following plurality of different embodiments of this invention is the same as that provided in the first embodiment, and the detailed description thereof will be omitted.

In the electromagnetic coil means provided in the first embodiment of the present invention, both the first and second groups of pins 21, 22 are bent upward, in which first outer sections 211 are substantially perpendicular to first inner sections 212, and second outer sections 221 are substantially perpendicular to second inner sections 222. A plane in which the centerlines of the first outer sections 211 lie and a plane in which the centerlines of the second outer sections 221 lie are substantially parallel to each other and are of an appropriate distance horizontally. The first and second head portions 211a, 221a extend out from the pin leading-out surface of the terminal part 23 which is an inclined surface 231, and an appropriate acute angle is formed between the first and second head portions 211a, 221a and the inclined surface 231.

The first and second groups of pins 21, 22 described in last paragraph are bent upward relative to the electromagnetic coil means disposed as shown in FIG. 2.

In this embodiment, the pin may be bent in the following way (and procedures before the bending of pins may be made a reference to the preceding description of FIG. 2): the stator component is placed into a bending machine tool; by setting a distance on the machine tool, the pins are divided into a first group of pins 21 and a second group of pins 22 spaced by an appropriate distance; then, the pins are bent by downward pressure provided by a cylinder or other facilities; the angle of bending is 90°, and of course, could be any other appropriate angles. It is also possible to perform the bending procedure earlier, right after the enameled wires of the upper and lower coil stators are wounded, in this case, the bending way of the pins of the upper and lower coil stators are the same.

By this arrangement, the distance between adjacent first and second head portions 211a, 221a and thus the distance between solder joints of adjacent pin head portions are increased, so that the insulation performance between the solder joints of the pin head portions are improved, and the stability and reliability of the operation of the electromagnetic coil means are ensured.

There is a height difference between the first head portions 211a and the second head portions 221a in a vertical direction, and the pin leading-out surface is provided as an inclined surface 231 which has an appropriate acute angle with respect to the first head portions 211a and second head portions 221a. By this arrangement, the first head portions 211a and the second head portions 221a protrude from the inclined surface 231, respectively, by lengths which are long enough and substantially equal, facilitating the soldering operation.

Figure 3:
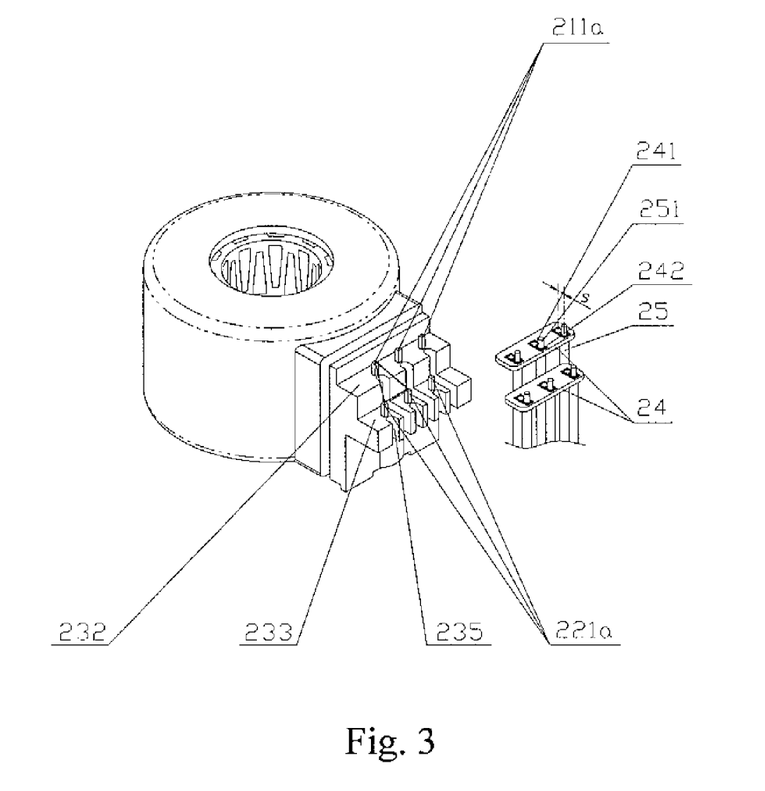
FIG. 3 is a schematic view of the structure of an electromagnetic coil means provided in a second embodiment of the present invention.

Reference is made to FIG. 3 which is a schematic view of the structure of an electromagnetic coil means provided in a second embodiment of the present invention.

The second embodiment of the present invention is a variation of the first embodiment in which the shape of the terminal part 23 is varied. The bending direction of the pins in the second embodiment is the same as that in the first embodiment, thus a detailed description thereof is omitted.

In the second embodiment, the pin leading-out surface of the terminal part 23 includes an upper step surface 232 and a lower step surface 233 that is substantially parallel to the upper step surface 232. The first head portions 211a are substantially perpendicular to the upper step surface 232 and the second head portions 221a are substantially perpendicular to the lower step surface 233.

The bending method of pins in the second embodiment is the same as that in the first embodiment, thus a detailed description thereof is omitted.

By the arrangement that the first and second head portions 211a, 221a are substantially perpendicular to the upper and lower step surfaces 232, 233, respectively, the first and second head portions 211a, 221a are enabled to protrude from the upper and lower step surfaces 232, 233 by lengths long enough, respectively, thus the operation of soldering is facilitated.

There is a height difference between the first head portions 211a and the second head portions 221a in the vertical direction. Accordingly, the pin leading-out surface is provided as upper and lower step surfaces 232, 233 which have a height difference in the vertical direction. This arrangement, when compared with the inclined surface 231 provided in the first embodiment, can reduce the materials used for the terminal part 23 and thus the manufacture cost.

Figure 4:
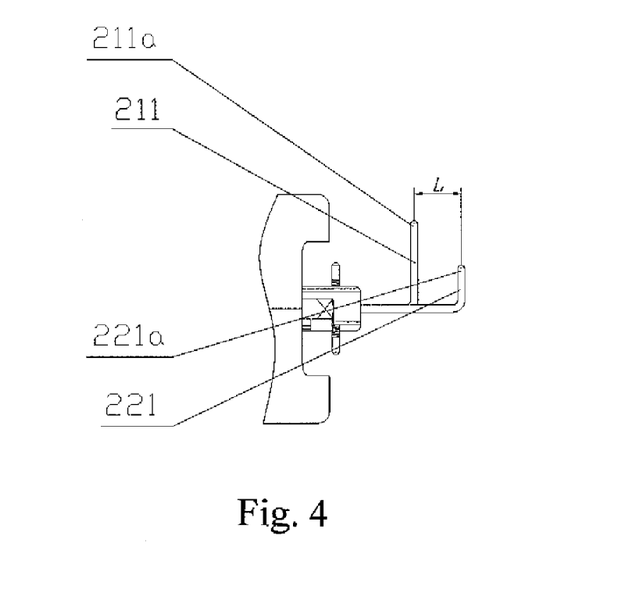
FIG. 4 is a schematic view of the relative position of a first and a second groups of pins in the electromagnetic coil means provided in the second embodiment of the present invention.
Figure 5:
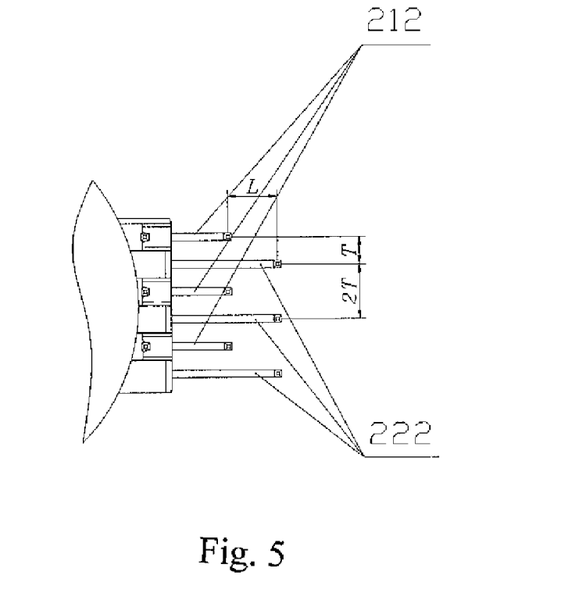
FIG. 5 is a top view of the relative position of the first and second groups of pins in the electromagnetic coil means provided in the second embodiment of the present invention.

Reference is made to FIGS. 3-5, in which FIG. 4 is a schematic view of the relative position of a first and a second groups of pins in the electromagnetic coil means provided in the second embodiment of the present invention, and FIG. 5 is a top view of the relative position of the first and second groups of pins in the electromagnetic coil means provided in the second embodiment of the present invention.

In the second embodiment, it is provided that each of the pins has equal size, and adjacent first and second inner sections 212, 222 have equal distance therebetween and are disposed in the same horizontal plane. As shown in FIG. 5, the distance between adjacent first and second inner sections 212, 222 are indicated with T, and the distance between adjacent first inner sections 212 and the distance between adjacent second inner sections 222 are indicated with 2T. As shown in FIG. 4 or 5, the horizontal distance between the planes in which the centerlines of the first and second outer sections 211, 221 are disposed is indicated with L.

When $$L < 4\sqrt{\frac{3}{2}}\,T$$

there is an appropriate distance between the first and second head portions 211a, 221a, thus a favorable insulation performance is ensured between the solder joints of pin head portions.

When $$L = \sqrt{\frac{3}{2}}\,T$$

as shown in FIG. 3, the distances between adjacent ends of adjacent first head portion 211a, the second head portion 221a, and next first head portion 211a or the distances between adjacent ends of adjacent second head portion 221a, first head portion 211a, and next second head portion 221a are substantially equal, and a generally regular triangle is formed by the ends of the three adjacent head portions. In this case, the insulation distances between adjacent solder joints of those three adjacent pin head portions are substantially equal, thus a favorable comprehensive insulation performance between the solder joints of pin head portions is provided.

Figure 6:
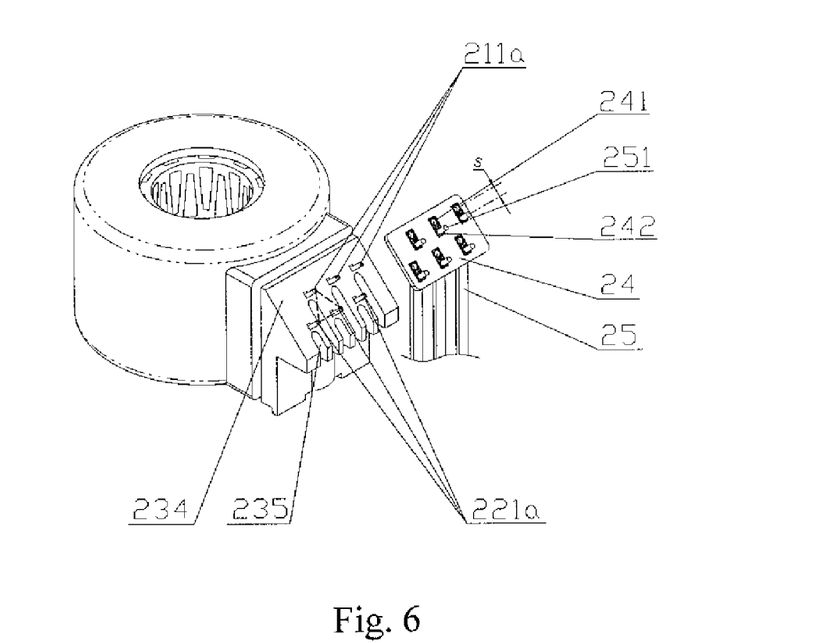
FIG. 6 is a schematic view of the structure of an electromagnetic coil means provided in a third embodiment of the present invention.
Figure 7:
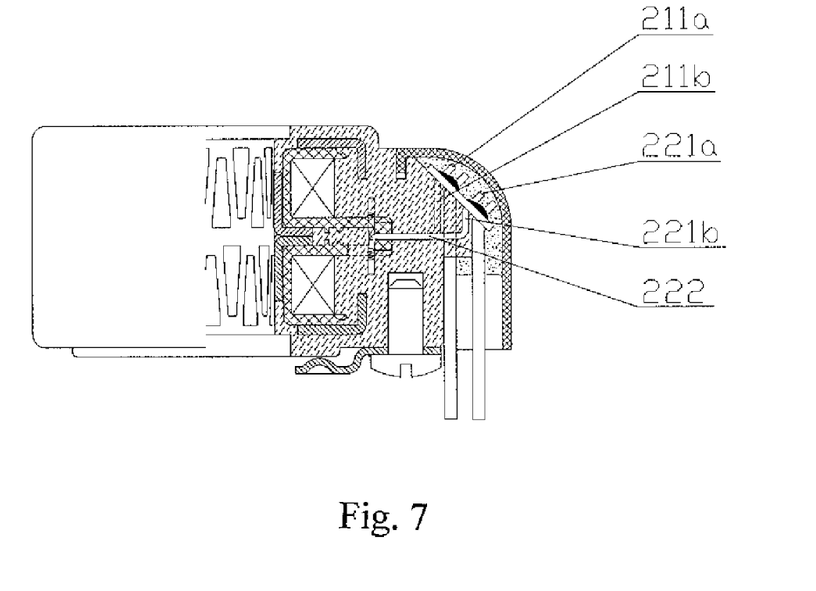
FIG. 7 is schematic section view of the electromagnetic coil means provided in the third embodiment of the present invention.

Reference is made to FIGS. 6, 7, in which FIG. 6 is a schematic view of the structure of an electromagnetic coil means provided in a third embodiment of the present invention, and FIG. 7 is schematic section view of the electromagnetic coil means provided in the third embodiment of the present invention.

In the third embodiment, the pin leading-out surface is an inclined surface 234, and first and second groups of pins 21, 22 (both shown in FIG. 2) bend upward. Middle portions 211b between the first inner sections 212 (shown in FIG. 2) and the first head portion 211a are substantially perpendicular to the first inner sections 212, and an appropriate angle is formed between the first head portions 211a and the first middle portions 211b. Middle portions 221b between the second inner sections 222 and the second head portions 221a are substantially perpendicular to the second inner sections 222, and an appropriate angle is formed between the second head portions 221a and the second middle portions 221b. The first and second head portions 211a, 221a are substantially perpendicular to the inclined surface 234.

The first and second groups of pins 21, 22 described in last paragraph both bend upward relative to the electromagnetic coil means disposed as shown in FIG. 7.

Before the package of the stator component, the bending method in the third embodiment is the same as that in the first embodiment. After the package, the packaged stator component needs to be placed onto a machine tool. The first and second head portions 211a, 221a are bent under a downward pressure provided by a cylinder or other facilities bend by an appropriate angle, such that they are substantially perpendicular to the inclined surface 234.

Compared with the first embodiment in which each of the first and second head portions 211a, 221a has an appropriate acute angle with respect to the inclined surface 231, the first and second head portions 211a, 221a in the third embodiment are arranged to be generally perpendicular to the inclined surface 234. This arrangement facilitates the extending of first and second head portions 211a, 221a out from the inclined surface 234, thus the soldering operation is further facilitated while favorable insulation performance between solder joints of adjacent pin head portions is ensured.

Figure 8:
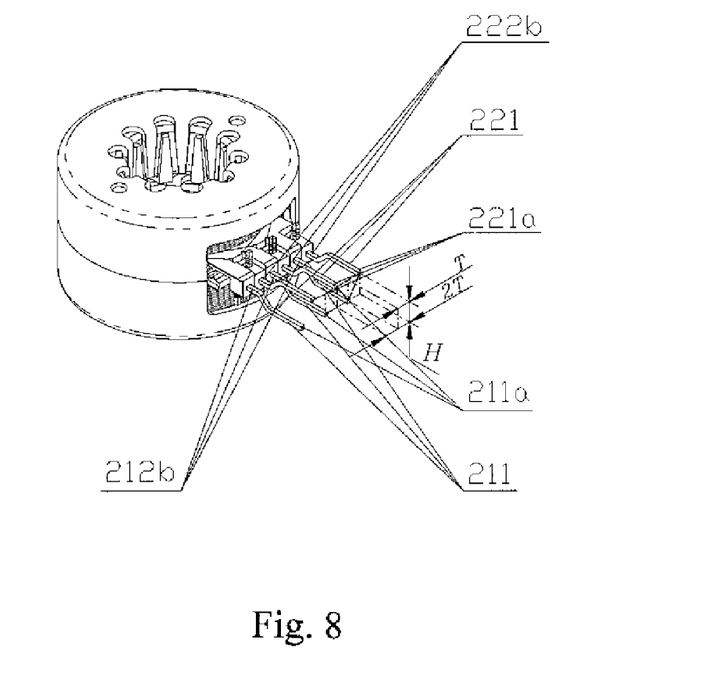
FIG. 8 is a schematic view of the structure of an electromagnetic coil means provided in a fourth embodiment of the present invention.

Reference is made to FIG. 8, which is a schematic view of the structure of an electromagnetic coil means provided in a fourth embodiment of the present invention.

In the fourth embodiment, one group of the first and second groups of pins 21, 22 (both shown in FIG. 2) bends upward, while the other group bends downward. A plane in which the centerlines of the first outer sections 211 lie and a plane in which the centerlines of the second outer sections 221 lie are substantially parallel to each other and spaced with an appropriate distance in the vertical direction. The first and second head portions 211a, 221a are substantially perpendicular to the pin leading-out surface of the terminal part 23 (shown in FIG. 10).

As described in the above paragraph, one group bends upward while the other bends downward with respect to the electromagnetic coil means placed as shown in FIG. 8.

The bending method of the pins in this embodiment is as follows: the upper and lower coil stators are wounded thereon with enamel wires and then placed on a pin bending machine tool. The die of the machine tool punches the pins of the upper and lower coil stators to be bent using the downward pressure of a cylinder. The pins of the upper and lower coil stators have the same bending shapes and need to be bent twice. It is also possible to carry out the bending procedure after the assembly of the stator component, by bending one group of pins upward and the other downward.

Compared with the situation where all of the pins are bent upward as described above, in the fourth embodiment, one group of pins are bend upward while the other group are bent downward, which can further increase the distance between adjacent first and second head portions 211a, 221a, and thus the distance between solder joints of adjacent pin head portions. Therefore, the insulation performance between the solder joints of the pin head portions are increased more effectively, ensuring the stability and reliability of the operation of electromagnetic coil means.

Based on the fourth embodiment described above, each pin may be further devised with the same dimension, and adjacent first and second root portions 212b, 222b have equal distances therebetween and lie in the same horizontal plane. As shown in FIG. 8, the distance between adjacent first and second root portions 212b, 222b is indicated with T, the distance between adjacent root portions of the first root portions 212b and that between adjacent root portions of the second root portions 222b are indicated with 2T, and the vertical distance between the plane in which the centerline of the first outer section 211 lies and the plane in which the centerline of the second outer section 221 lies is indicated with H.

When $H \langle 4\sqrt{3}T$, there is an appropriate distance between the first and second head portions 211a, 221a, thus a preferable performance between the solder joints of the pin head portions is ensured.

When $H=\sqrt{3}T$, as shown in FIG. 8, the distances between adjacent ends of adjacent first head portion 211a, the second head portion 221a, and next first head portion 211a or the distances between adjacent ends of adjacent second head portion 221a, first head portion 211a, and next second head portion 221a are substantially equal, and a generally regular triangle is formed by the ends of the three adjacent head portions. In this case, the insulation distances between adjacent solder joints of those three adjacent pin head portions are substantially equal, thus a favorable comprehensive insulation performance between the solder joints of pin head portions is provided.

As shown in FIG. 3 or 6, the first and second head portions 211a, 221a may be further connected with cable leads 25 through a circuit board 24, and the terminal part 23 may further have linear grooves 235 for receiving the cable leads 25. The number of the linear grooves 235 are equal to that of the cable leads 25, and each cable lead 25 is located within one linear groove 235, thereby on one hand the cable leads 25 are fixed while on the other hand, the cable leads 25 are insulated, further improving the insulation performance between cable leads 25.

As shown in FIG. 3 or 6, the circuit board 24 may further have pin holes 241 and core holes 242 each as many as the pins. The pin holes 241 and core holes 242 may be arranged in pairs adjacent to each other, and connected with each other by conducting materials which may be conducting copper foil particularly. The first and second head portions 211a, 221a extend out from pin holes 241, and the head portions 251 of the cable leads extend out from the core holes 242. The first and second head portions 211a, 221a are soldered with the cable lead head portions 251 by soldering materials which may be tin solder particularly.

The first and second head portions 211a, 221a extend out from the pin holes 241, and the cable lead head portions 251 extend out from the core holes 242. Due to the fact that the pin holes 241 and core holes 242 are arranged adjacent to each other, the first and second head portions 211a, 221a can be close to the cable lead head portions 251, respectively, thus the soldering operation is facilitated and the soldering quality is improved.

As shown in FIG. 3 or 6, the center distance between pin holes and core holes is indicated with S.

When S is greater than 0.5 times the sum of diameters of pin holes 241 and core holes 242 and less than 5 times thereof, there is an appropriate center distance between pin holes 241 and core holes 242, thus the electrical communication between the first and second head portions 211a, 221a and the cable lead head portion 251 is achieved directly through tin solder.

Figure 9:
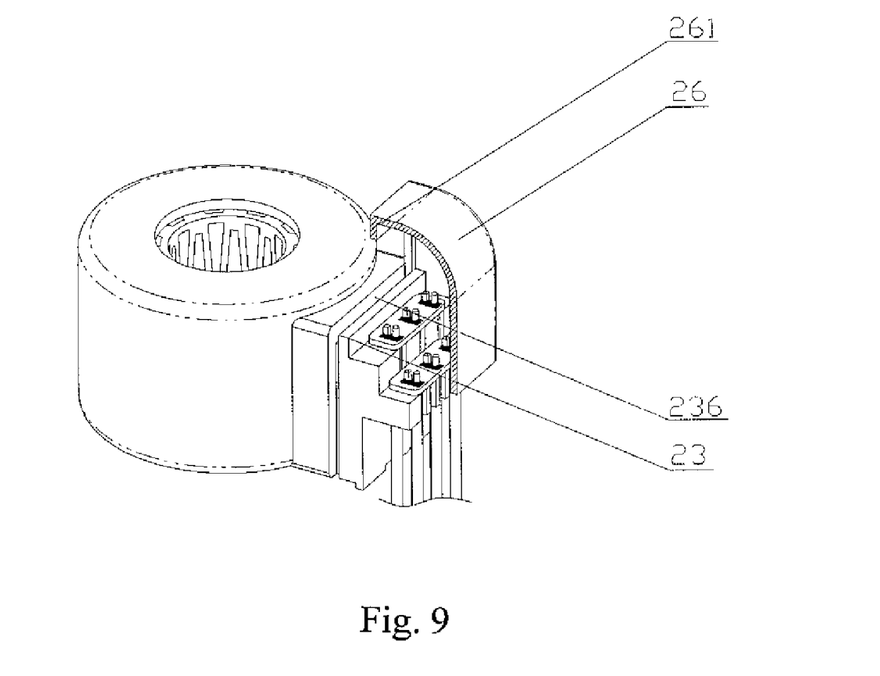
FIG. 9 is a schematic view of installation of a cover of electromagnetic coil means provided in the second embodiment of the present invention.
Figure 10:
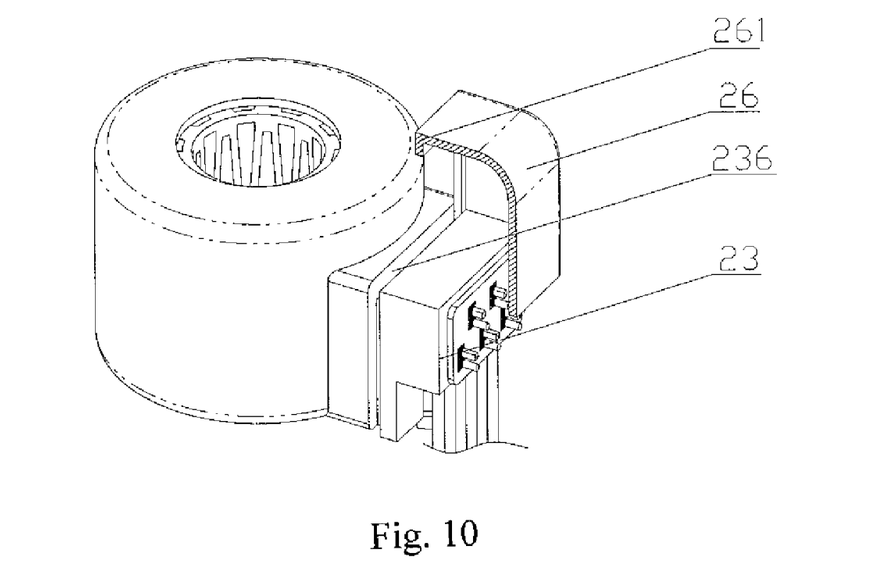
FIG. 10 a schematic view of installation of a cover of electromagnetic coil means provided in the fourth embodiment of the present invention.

Reference is made to FIGS. 9, 10, in which FIG. 9 is a schematic view of installation of a cover of the electromagnetic coil means provided in the second embodiment of the present invention, and FIG. 10 a schematic view of installation of a cover of the electromagnetic coil means provided in the fourth embodiment of the present invention.

The electromagnetic coil means further comprises a cover 26 with a protruded locating portion 261, and the terminal part 23 has a locating groove 236 engaged with the protruded locating portion 261. The protruded locating portion 261 engages with the locating groove 236 and is sealed therewith by resin materials. When performing packaging by resin materials, the protrusion-groove engaging between the protruded locating portion 261 and the locating groove 236 can prevent the resin materials from leaking out.

As shown in FIG. 2, the frame of the electromagnetic coil means has an upper frame 271 and a lower frame 272 detachable from the upper frame 271. Each of the upper and lower frames 271, 272 have the same structure and size, thereby do not need to be distinguished from each other, resulting in an easy installation and a reduced operating cost.

A detailed description has been made to an electromagnetic coil means provided in the present invention. In this description, specific examples are used for illustrating the principle and embodiments of the present invention, and the description of the embodiments are only intended for helping to understand the method and its essential spirit of this invention. It should be appreciated by those skilled in art that it is still possible to make modification or alteration to this invention, which falls within the scope of protection of this invention, without deviating the principle thereof.

What is claimed is:

1. An electromagnetic coil means, comprising a terminal part and pins passing through the terminal part, wherein:
   the pins are divided into a first group of pins connected with an upper coil stator and a second group of pins connected with a lower coil stator which are spaced apart from each other;
   the first group of pins comprises first outer sections with first head portions and first inner sections with first root portions; the second group of pins comprising second outer sections with second head portion and second inner sections with second root portions;
   the first and second head portions extend out from a pin leading-out surface of the terminal part, characterized in that at least one group of the first and second groups of pins is bent, and a distance between adjacent said first and second head portions is larger than that between adjacent said first and second root portions.

2. The electromagnetic coil means according to claim 1, characterized in that both the first and second groups of pins are bent upward; the first outer sections are substantially perpendicular to the first inner sections, and the second outer sections are substantially perpendicular to the second inner sections; a plane in which the centerlines of the first outer sections lie and a plane in which the centerlines of the second outer sections lie are substantially parallel and have an appropriate horizontal distance therebetween.

3. The electromagnetic coil means according to claim 2, characterized in that the pin leading-out surface is an inclined surface, and an appropriate acute angle is formed between the first and second head portions and the inclined surface.

4. The electromagnetic coil means according to claim 2, characterized in that the pin leading-out surface comprises an upper step surface and a lower step surface substantially parallel to the upper step surface; the first head portions are substantially perpendicular to the upper step surface, and the second head portions are substantially perpendicular to the lower step surface.

5. The electromagnetic coil means according to claim 2, characterized in that the first and second head portions are connected with cable leads by means of a circuit board; and the terminal part has linear grooves for receiving the cable leads.

6. The electromagnetic coil means according to claim 2, characterized by further comprising a cover with a protruded locating portion, and the terminal part comprises a locating groove engaging with the protruded locating portion; and the protruded locating portion engages with the locating groove and is sealed therewith by resin materials.

7. The electromagnetic coil means according to claim 3, characterized in that the first and second head portions are connected with cable leads by means of a circuit board; and the terminal part has linear grooves for receiving the cable leads.

8. The electromagnetic coil means according to claim 3, characterized by further comprising a cover with a protruded locating portion, and the terminal part comprises a locating groove engaging with the protruded locating portion; and the protruded locating portion engages with the locating groove and is sealed therewith by resin materials.

9. The electromagnetic coil means according to claim 4, characterized in that each of said pins has the same size, and adjacent first and second inner sections have equal distance, therebetween and lie in the same horizontal plane; the horizontal distance is less than $$4\sqrt{\frac{3}{2}}$$

times the distance between adjacent first and second inner sections.

10. The electromagnetic coil means according to claim 4, characterized in that the first and second head portions are connected with cable leads by means of a circuit board; and the terminal part has linear grooves for receiving the cable leads.

11. The electromagnetic coil means according to claim 4, characterized by further comprising a cover with a protruded locating portion, and the terminal part comprises a locating groove engaging with the protruded locating portion; and the protruded locating portion engages with the locating groove and is sealed therewith by resin materials.

12. The electromagnetic coil means according to claim 9, characterized in that the horizontal distance equals to $$\sqrt{\frac{3}{2}}$$

times the distance between adjacent first and second inner sections.

13. The electromagnetic coil means according to claim 9, characterized in that the first and second head portions are connected with cable leads by means of a circuit board; and the terminal part has linear grooves for receiving the cable leads.

14. The electromagnetic coil means according to claim 9, characterized by further comprising a cover with a protruded locating portion, and the terminal part comprises a locating groove engaging with the protruded locating portion; and the protruded locating portion engages with the locating groove and is sealed therewith by resin materials.

15. The electromagnetic coil means according to claim 12, characterized in that the first and second head portions are connected with cable leads by means of a circuit board; and the terminal part has linear grooves for receiving the cable leads.

16. The electromagnetic coil means according to claim 12, characterized by further comprising a cover with a protruded locating portion, and the terminal part comprises a locating groove engaging with the protruded locating portion; and the protruded locating portion engages with the locating groove and is sealed therewith by resin materials.

17. The electromagnetic coil means according to claim 1, characterized in that the pin leading-out surface is an inclined surface, both the first and second groups of pins are bent upward; first middle portions between the first inner sections and the first head portions are substantially perpendicular to the first inner sections, and an appropriate angle is formed between the first head portions and the first middle portions; second middle portions between the second inner sections and the second head portions are substantially perpendicular to the second inner sections, and an appropriate angle is formed between the second head portions and the second middle portions; the first and second head portions are substantially perpendicular to the inclined surface.

18. The electromagnetic coil means according to claim 17, characterized in that the first and second head portions are connected with cable leads by means of a circuit board; and the terminal part has linear grooves for receiving the cable leads.

19. The electromagnetic coil means according to claim 17, characterized by further comprising a cover with a protruded locating portion, and the terminal part comprises a locating groove engaging with the protruded locating portion; and the protruded locating portion engages with the locating groove and is sealed therewith by resin materials.

20. The electromagnetic coil means according to claim 1, characterized in that one group of the first and second groups of pins are bent upward while the other group are bent downward; a plane in which the centerlines of the first outer sections lie and a plane in which the centerlines of the second outer sections lie are substantially parallel to each other and spaced apart with an appropriate vertical distance; the first and second head portions are substantially perpendicular to the pin leading-out surface.

21. The electromagnetic coil means according to claim 20, characterized in that each of said pins has the same size, and adjacent first and second root portions have equal distances therebetween and lie in the same horizontal plane; the vertical distance is less than $4\sqrt{3}$ times the distance between adjacent first and second root portions.

22. The electromagnetic coil means according to claim 20, characterized in that the first and second head portions are connected with cable leads by means of a circuit board; and the terminal part has linear grooves for receiving the cable leads.

23. The electromagnetic coil means according to claim 20, characterized by further comprising a cover with a protruded locating portion, and the terminal part comprises a locating groove engaging with the protruded locating portion; and the protruded locating portion engages with the locating groove and is sealed therewith by resin materials.

24. The electromagnetic coil means according to claim 21, characterized in that the vertical distance equals to $\sqrt{3}$ times the distance between adjacent first and second root portions.

25. The electromagnetic coil means according to claim 21, characterized in that the first and second head portions are connected with cable leads by means of a circuit board; and the terminal part has linear grooves for receiving the cable leads.

26. The electromagnetic coil means according to claim 21, characterized by further comprising a cover with a protruded locating portion, and the terminal part comprises a locating groove engaging with the protruded locating portion; and the protruded locating portion engages with the locating groove and is sealed therewith by resin materials.

27. The electromagnetic coil means according to claim 24, characterized in that the first and second head portions are connected with cable leads by means of a circuit board; and the terminal part has linear grooves for receiving the cable leads.

28. The electromagnetic coil means according to claim 24, characterized by further comprising a cover with a protruded locating portion, and the terminal part comprises a locating groove engaging with the protruded locating portion; and the protruded locating portion engages with the locating groove and is sealed therewith by resin materials.

29. The electromagnetic coil means according to claim 1, characterized in that the first and second head portions are connected with cable leads by means of a circuit board; and the terminal part has linear grooves for receiving the cable leads.

30. The electromagnetic coil means according to claim 29, characterized in that the circuit board comprises pin holes and core holes each as many as the pins; the pin holes and core holes are arranged in pairs adjacent to each other and connected with each other by conducting materials; the first and second head portions extend out from the pin holes, and head portions of the cable leads extend out from the core holes; the first and second head portions are soldered with the head portions of the cable leads by soldering materials.

31. The electromagnetic coil means according to claim 30, characterized in that the center distance between the pin holes and the core holes is greater than 0.5 times the sum of diameter of pin holes and diameter of core holes and less than 5 times thereof.

32. The electromagnetic coil means according to claim 1, characterized by further comprising a cover with a protruded locating portion, and the terminal part comprises a locating groove engaging with the protruded locating portion; and the protruded locating portion engages with the locating groove and is sealed therewith by resin materials.

33. The electromagnetic coil means according to claim 32, characterized in that the electromagnetic coil means comprises a frame, which in turn comprises an upper frame and a lower frame detachable from the upper frame, and the upper and lower frames have the same structure and size.

* * * * *